T. W. Harvey,
Cotton Press.
N° 2,941.   Patented Feb. 4, 1843.
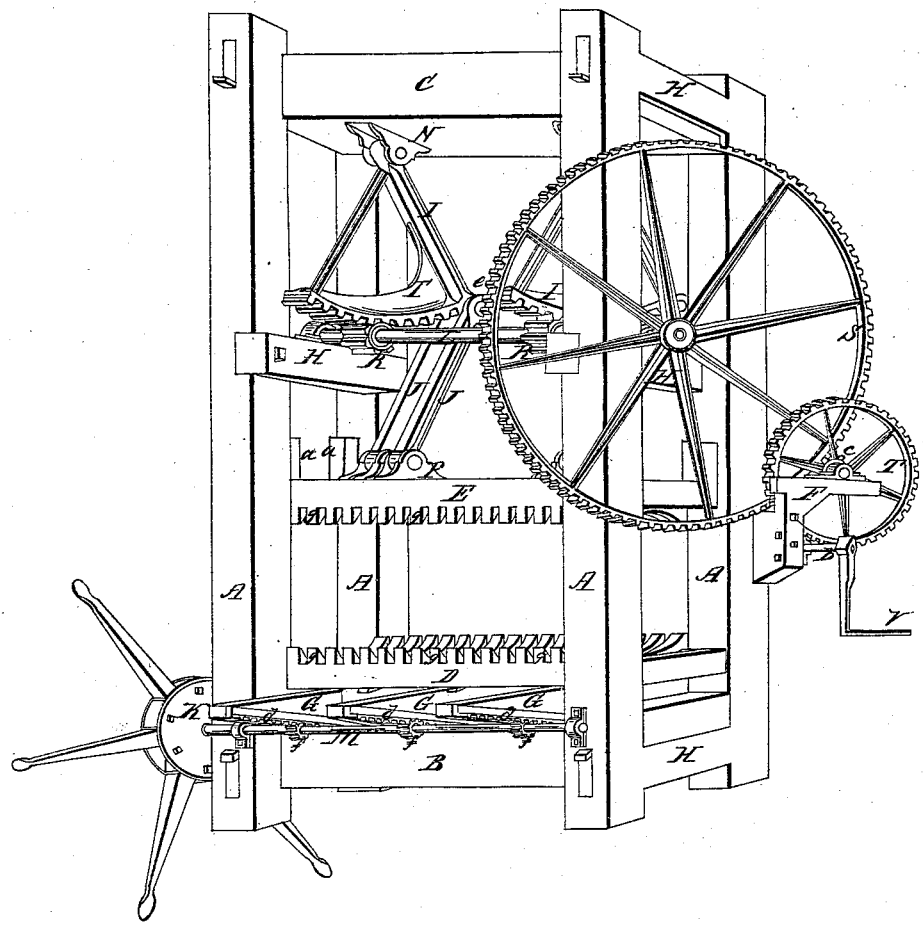

UNITED STATES PATENT OFFICE.

THOS. W. HARVEY, OF NEW YORK, N. Y.

IMPROVEMENT IN THE CONSTRUCTION OF PRESSES.

Specification forming part of Letters Patent No. 2,941, dated February 4, 1843.

*To all whom it may concern:*

Be it known that I, THOMAS W. HARVEY, of the city of New York, in the State of New York, have invented a new and useful Improvement in a Machine or Press for Pressing Bales of Cotton and other Packages, for the purpose of reducing them in size for convenience in shipping; and I do hereby declare that the following is a full and exact description thereof.

My first improvement consists in the form which I give to the faces of the bed and of the follower of my press. In the manner of constructing the presses hitherto employed for the compressing of cotton and other substances of a like character the bed and follower of the press used have been made flat; and when bales are thus pressed and the baling-rope has been applied and secured to the bale it is invariably found that on raising the follower and liberating the bale an essential change is produced in its form, as the contained material will, from its elasticity, cause the sides of the bale to become convex, and the thickness of the bale will, in consequence, be considerably increased. The baling-rope will also at the same time sink deeply into that part of the bale which constituted its angles while it was under pressure, the bale being at that period rectangular. This springing out of the bale on the sides and the sinking of the rope at the angles have manifestly the effect of counteracting and undoing much of what was accomplished by the power applied to the press. The improvement by which I obviate this difficulty consists in making the face of the bed and of the follower of the press concave from side to side along their whole length, the concavity being such as will give to the sides of the bale that convexity which it naturally tends to assume when the pressure is removed from it. By means of this device the parts of the bale which form the angles, under the ordinary mode of procedure, are pressed harder than the other parts, and the rope has, consequently, little or no tendency to sink more there than elsewhere, and the whole bale will maintain the same form and dimensions, nearly, after it leaves the press as that which it assumed while in it, and it is consequently held down several inches less in thickness than under the ordinary procedure. The press which I prefer to use is of that kind which is usually known under the name of the "toggle-joint" or "progressive-lever" press, and the levers of which are made to operate, by means of racks and pinions, in a manner to be presently described.

My second improvement consists in the particular manner in which I raise the bed of the press so as to cause the space between it and the follower to correspond with the thickness of the bale which is to be compressed, so that it may in all cases receive the full effect resulting from the straightening of the toggle-joints.

The accompanying drawings give a perspective representation of my improved press.

A A are the posts, B the stationary bed, and C the cap. Above the stationary bed is a second or adjusting bed, D, and E is the follower or platen. The adjustable bed rests upon three or any preferred number of sliding wedges, G G G. These wedges slide in guide-grooves and have racks $d\ d\ d$ upon their lower sides, into which the pinions $f\ f\ f$ on the shaft $m$ are made to gear, so that by turning said shaft by means of the spoke-wheel K or by a winch acting upon a wheel and pinion the wedges may be simultaneously moved back and forth and the adjustable bed D raised or depressed. Those who are in the practice of repacking bales of cotton can readily judge by the eye of the amount of adjustment required in order to give to each bale, when compressed, the same density nearly enough for all practical purposes, and this density, as before indicated, they should attain when the toggle-joint is straightened, without which precaution a portion of the power of the press will be lost, a circumstance that renders the adjustment of the bed a matter of primary importance. The concavity of the faces of the bed D and of the platen E may be given to them by means of the battens $g\ g\ g$, which cross them from side to side, as shown in the end view of the follower, Fig. 2. Between these battens the baling-rope is to be laid in the ordinary way, the bed and follower of this press not differing from others except in the concavity given to them for the purpose above set forth.

The gearing of this press may be varied; but the manner of gearing represented in the drawings has been found to answer well in practice.

V is a winch, to which the power of a man may be applied, and will be found sufficient. On the shaft of this winch there is a pinion at $b$, which gears into the spur-wheel T, and a pinion at c on the shaft of this cog-wheel gears into the large spur-wheel S, which is placed upon one end of the main shaft L of the machine. I use two sets of progressive levers or toggle-joints, the two levers of one set being shown at I and J. Each of the upper levers has a toothed segment, I', attached to it, into which segments the pinions R R engage, and thus serve to straighten the levers and press down the follower, or to raise it when necessary.

N is the upper step and P the lower step of the progressive levers.

a a are guide-pieces attached to the follower, and which may be furnished with friction-rollers to bear against the posts A A.

I have said that the arrangement of the gearing of this press may be varied, and I have contemplated the so arranging it as to cause the toggle-joints to pass out between the posts at each end of the press as the platen or follower is raised, instead of passing out toward the back, as shown in the drawings. In this case there will be two short shafts crossing the frame from front to back to perform the office of that marked L, each of them furnished with a pinion similar to those marked R. This manner of arranging the parts will render the guide-pieces of the follower unnecessary, as the flexure of the levers will not cause it to be pressed against the posts. The driving-shaft, crossing the end of the machine, may then have a winch at each end and the press be worked by two men, the gearing being adapted thereto and to the position of the toggle-joints. When iron bars are used to sustain the pressure instead of the posts A A, this arrangement will be especially appropriate thereto.

Having thus fully described the nature of my improvements in the press for compressing bales of cotton and other articles, what I claim therein as new, and desire to secure by Letters Patent, is—

1. The manner in which I adjust the bed of the press and regulate its distance from the follower by means of a series of wedges placed between the stationary and the adjustable beds and moved back and forth simultaneously by means of racks and pinions, arranged substantially as above set forth.

2. The manner of giving to the compressed bale while under pressure the form, or nearly the form, which it will assume when the pressure is removed, by making the faces of the bed and follower concave, by which I am enabled to retain nearly the whole of the advantage gained in the operation of pressing, as herein fully made known; and although I have shown and described such an arrangement of the other parts of the press as I deem the best, it will be manifest that my improvements are equally well adapted to presses otherwise arranged, and may be employed therein with equal advantage.

THOS. W. HARVEY.

Witnesses:
  THOS. P. JONES,
  JOHN HITZ.